(12) United States Patent
Tassone (10) Patent No.: US 7,636,505 B2
(45) Date of Patent: Dec. 22, 2009

(54) MICROSTRUCTURED OPTICAL FIBER

(75) Inventor: Francesco Maria Tassone, Milan (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 0 days.

(21) Appl. No.: 11/579,165

(22) PCT Filed: May 12, 2004

(86) PCT No.: PCT/EP2004/050772

§ 371 (c)(1),
(2), (4) Date: Aug. 8, 2007

(87) PCT Pub. No.: WO2005/109056

PCT Pub. Date: Nov. 17, 2005

(65) Prior Publication Data

US 2008/0138022 A1    Jun. 12, 2008

(51) Int. Cl.
*G02B 6/032*    (2006.01)
(52) U.S. Cl. .................................. 385/125
(58) Field of Classification Search ............... None
See application file for complete search history.

(56) References Cited

U.S. PATENT DOCUMENTS

| 5,774,779 | A | 6/1998 | Tuchinskiy |
| 5,802,236 | A | 9/1998 | DiGiovanni et al. |
| 6,404,965 | B2 | 6/2002 | Jones et al. |
| 7,280,730 | B2 * | 10/2007 | Dong et al. ............... 385/126 |
| 2004/0136669 | A1 * | 7/2004 | Hasegawa et al. ......... 385/125 |
| 2005/0286847 | A1 * | 12/2005 | Arimondi et al. ......... 385/123 |

FOREIGN PATENT DOCUMENTS

EP    1 054 273    11/2000

(Continued)

OTHER PUBLICATIONS

Minkovich et al., "Large-Hole-Large-Spacing Holey Fibers With a Few Air Holes: Fabrication and Measurements of Light-Delivering Properties and Optical Losses", Photonic Crystals, Laser Physics, vol. 14, No. 5, pp. 767-771, (2004).

(Continued)

*Primary Examiner*—Mike Stahl
(74) *Attorney, Agent, or Firm*—Finnegan, Henderson, Farabow, Garrett & Dunner, L.L.P.

(57) ABSTRACT

An optical fiber includes an optical fiber axis; a core extending along the axis, the core being made of a first, undoped material having a first refractive index; and a cladding coextensive to and surrounding the core. The cladding includes a background matrix made of the first material and has a plurality of holes formed in the background matrix extending parallel to the fiber axis arranged around the core in substantially concentric rings, and filled with a second material having a second refractive index lower than the first refractive index. The number of the rings of holes is two or three, an average distance between the holes is at least about 6 μm, a ratio between an effective radius of the core and the average distance between the holes is at most about 1, and a ratio between an average dimension of the holes and the average distance between the holes is at least about 0.5.

14 Claims, 4 Drawing Sheets

FOREIGN PATENT DOCUMENTS

| | | |
|---|---|---|
| EP | 1 172 339 | 1/2002 |
| EP | 1 273 937 | 1/2003 |
| EP | 1 437 612 | 7/2004 |
| WO | WO 01/37008 | 5/2001 |
| WO | WO 02/39159 | 5/2002 |

OTHER PUBLICATIONS

Sakaguchi et al., "Rayleigh Scattering in Silica Glass With Heat Treatment", Journal of Non-Crystalline Solids, vol. 220, pp. 178-186, (1997).

Tsujikawa et al., "Rayleigh Scattering Reduction Method for Silica-Based Optical Fiber", Journal of Lightwave Technology, vol. 18, pp. 1528-1532, (2000).

Le Parc et al., "Thermal Annealing and Density Fluctuations in Silica Glass", Journal of Non-Crystalline Solids, vol. 293-295, pp. 366-369, (2001).

Sakaguchi et al., "Optical Properties of GeO2 Glass and Optical Fibers", Applied Optics, vol. 36, pp. 6809-6814, (1997).

Bjarklev et al., "Photonic Crystal Fibres—The State-of-the-Art", 28th European Conference on Optical Communication ECOC 02, Copenhagen, Denmark, 2 pages, (2002).

Farr et al., "Low Loss Photonic Crystal Fibre", 28th European Conference on Optical Communication ECOC 02, Copenhagan, Denmark, 2 pages, (2002).

Tajima et al., "Low-Loss Photonic Crystal Fibers", OFC 2002, ThS3, pp. 523-525, (2002).

Asnaghi et al., "Fabrication of a Large-Effective-Area Microstructured Plastic Optical Fibre: Design and Transmission Tests", ECOC 2003, 2 pages, (2003).

White et al., "Confinement Losses in Microstructured Optical Fibers", Optical Letters, vol. 26, pp. 1660-1662, (2001).

Ferrarini et al., "Leakage Losses in Photonic Crystal Fibers", F15, OFC 2003, vol. 2, pp. 699-700, (2003).

Marcuse, "Curvature Loss Formula for Optical Fibers", Journal of the Optical Society of America, vol. 66, pp. 216-220, (1976).

T. Sorensen et al.; "Macro-bending loss properties of photonic crystal fibre", Electronic Letters, vol. 37, No. 5. pp. 287-289, (2001).

* cited by examiner

MICROSTRUCTURED OPTICAL FIBER

CROSS REFERENCE TO RELATED APPLICATION

This application is a national phase application based on PCT/EP2004/050772, filed May 12, 2004, the content of which is incorporated herein by reference.

BACKGROUND OF THE INVENTION

1. Field of the Invention

The present invention generally relates to the field of optical fibers, more particularly to microstructured optical fibers.

2. Description of the Related Art

Optical fibers are largely used in optical telecommunication systems.

In several applications, fiber transmission loss is a critical aspect. For example, fiber loss is a major constraint from which the structure of a long-haul optical transmission system and the related costs depend.

Silica-based transmission fibers exhibit a typical transmission loss of about 0.2 dB/km in a wide spectral window of several tens of nanometers, centered at about 1550 nm. Due to fiber loss (and also to material's intrinsic nonlinearities) the maximum fiber span length is typically not higher than 100 km, and the power loss in such length can be of over 20 dB.

The resulting segmentation of a long-haul link into shorter intermediate spans contributes to the complexity and costs of the overall system. Thus, even a minor reduction of the fiber loss would result into a great overall economic advantage. Benefits could follow even in applications involving shorter links, where single spans are needed, because requirements on the optical components at the link termination would be relaxed thanks to an increase in the power budget.

Currently, silica-based transmission fibers typically include germanium doping in the fiber core, so as to achieve the desired refractive index difference between the core and cladding.

Several studies have shown that in low-loss, silica-based fibers, the loss results from four main contributions: the Rayleigh scattering from density fluctuations in the core material, the Rayleigh scattering from concentration fluctuations of the dopants, the loss resulting from waveguide imperfections, and the infrared absorption loss. These conclusions are for example reported in S. Sakaguchi et al., 'Rayleigh scattering in silica glass with heat treatment', Journal of Non-Crystalline Solids 220, 1997, pp. 178-186; K. Tsujikawa et al., 'Rayleigh Scattering Reduction Method for Silica-Based Optical Fiber', Journal of Lightwave Technology 18, pp. 1528-1532; R. Le Parc et al., 'Thermal annealing and density fluctuations in silica glass', Journal of Non-Crystalline Solids 293-295, 2001, pp. 295 366; and in the U.S. Pat. No. 6,404,965. The first and third above-cited contributions to fiber loss can be optimized through an appropriate profile design and through the optimization of the fiber drawing process. In particular, the preform drawing speed and temperature, the drawing tension and the annealing furnace temperature can reduce the glass fixation temperature and therefore reduce the first and third contributions to fiber loss cited above.

However, the Rayleigh scattering loss resulting from fluctuations of the concentration of the dopants cannot be avoided by any of these optimization techniques. In particular, as a relevant amount of $GeO_2$ is used in the fibers to provide the necessary up-doping in the fiber core, typically a loss of at least 0.02 dB/km is to be ascribed to the presence of the dopant, as reported in Sakaguchi et al., 'Optical properties of $GeO_2$ glass and optical fibers', Applied Optics, Vol. 36, 1997, p. 6809-6814.

Pure silica core (i.e., undoped core) fibers can potentially feature a lower loss than fibers with germanium-doped core. In a pure silica core fiber, a doped cladding of lower refractive index than the core has to be provided in order to confine light in the core. Since only a small fraction of the transmitted light travels in the cladding, the pure silica core fibers can potentially maintain the low loss of pure silica.

A known solution for making a pure silica core is to dope the silica cladding with fluorine so as to achieve a suitable refractive index profile. However, the Applicant observes that a drawback of this type of fibers is that the whole cladding has to be doped with fluorine, and the manufacturing process is therefore more expensive, since the volume of material to be doped is much greater than in the core.

A third solution which avoids either up-doping of the fiber core or low-doping of the cladding is provided by microstructured fibers, i.e. fibers having a microstructured cladding wherein holes, typically filled with air (generally, with a material having a lower refractive index than silica) run along the fiber parallel to the fiber axis. A brief review of these fibers, also known as "Photonic Crystal Fibers" (PCFs) or "Photonic BandGap fibers" (PBG) or "holey fibers", is provided in A. Bjarklev et al., 'Photonic crystal fibres—The state-of-the-art', $28^{th}$ European Conference on Optical Communication ECOC 02, Copenhagen, Denmark, 2002.

Microstructured fibers can be manufactured in several different ways. One method, known as "stack-and-draw", includes stacking silica capillary tubes inside a hollow glass cylinder in a close-packed space arrangement, welding the tubes together and then drawing the resulting preform by a conventional fiber preform drawing method.

Although microstructured claddings may be combined with an up-doped core, typically the microstructured fibers have a core made of a low-loss, pure (i.e., not doped) material, such as pure silica, the guiding of light in the core being ensured by the provision of the microstructured cladding. In fact, the pattern of holes, typically air-filled, leads to an effective lowering of the refractive index. Potentially, the loss in these fibers could benefit from all the optimizations of the drawing conditions previously discussed, without any penalty related to relevant quantities of chemical dopants which are instead used in conventional fibers, including the low-doped cladding, pure silica core fibers.

However, microstructured fibers proposed so far are still affected by loss problems.

In L. Farr et al., 'Low loss photonic crystal fibers', $28^{th}$ European Conference on Optical Communication ECOC 02, Copenhagen, Denmark, 2002, a loss of 0.58 dB/km at 1550 nm in a microstructured fiber having a pure, undoped silica core, with an outer diameter of 170 μm, a pitch A between the holes (holes spacing) of 4.2 μm, an air hole diameter d of 1.85 μm and at least four shells of holes or sixty holes as shown in FIGS. 1 (a) and 1 (b) has been reported. Such a loss value is much larger than what is obtained in conventional (i.e., non-microstructured) fibers. The excess loss has been ascribed to absorption from the hydroxyl group, from metal impurities, and from a remarkable increase in the Rayleigh scattering.

K. Tajma et al., 'Low-loss photonic crystal fibers', OFC 2002, ThS3, p. 523-524, compares two types of PCF: a first type having conventional core and cladding structure ($GeO_2$-doped silica core and pure silica cladding) and six holes on one ring around the core to shift the zero-dispersion wavelength, and a second type made of pure silica glass and having sixty holes in the cladding.

Both of the structures of Tajma et al. have loss problems. The GeO$_2$-doped core fiber exhibits the Rayleigh scattering problems previously mentioned, while the fiber with a high number of holes has high Rayleigh scattering contributions from silica-air hole imperfections (such as roughness of the hole surfaces) and from OH contamination. In addition to the contamination and surface scattering problems, which are detrimental for the fiber loss, a fiber with a large number of holes is also more difficult to manufacture, due to the complexity in making the holes, and potentially suffers from mechanical strength problems both during the manufacturing process and during its use, due to the large empty volume in its structure. In particular, the final shape of the holes resulting from the fiber preform drawing, the strength of the fiber and the splicing properties are all adversely related to their total number.

A microstructured fiber with a smaller number of holes has been described in D. Asnaghi et al. "Fabrication of a large-effective-area microstructured plastic optical fiber: design and transmission tests", ECOC 2003. The fiber is made of plastic and comprises two shells of holes distributed over a hexagonal pattern, with the central hole and the inner shell of holes lacking. A large effective core radius $r_{\it eff}$ is obtained with relative small hole-to-hole distance $\Lambda$. In particular, $r_{\it eff}$=1.44$\Lambda$. The Applicant observes that the fibers described by Asnaghi et al. is a multimode fiber unsuitable for long-distance optical telecommunications.

Further researches on microstructured fibers have demonstrated that reducing the number of holes can be disadvantageous in terms of transmission loss.

For example, T. P. White et al., 'Confinement losses in microstructured optical fibers', Optics Letters, vol 26, 2001, p. 1660-1662, and D. Ferrarini et al., 'Leakage Losses in Photonic crystal Fibers', F15, OFC 2003, vol. 2, p. 699-700, report that radiation losses are very high when the number of rings of holes in the cladding is small, since the transmitted radiation leaks away through a thin microstructured cladding. Both these articles show that the fiber performances in terms of attenuation are progressively improved passing from one ring to eight rings of holes. Also, in these articles the dependencies of the fiber loss on the cladding leakage as a function of $\Lambda/\lambda$ (where $\Lambda$ is the hole spacing and $\lambda$ is the wavelength of the propagating light), d/$\Lambda$ (where d is the hole diameter) and the number N of rings of holes in the cladding are discussed.

The Applicant is of the opinion that the quantitative results reported in the paper by T. P. White et al., referenced in the foregoing, are not particularly precise, because the electromagnetic field, which is a vectorial quantity, is there treated as a scalar quantity. Such a simplification is, according to the Applicant, of limited accuracy when large refractive index steps exist in the structure to be analyzed, such as those existing between the air in the holes and the background matrix at the hole surface. Furthermore, in the considered prior-art reference a fake material absorption in the background matrix was introduced, which could in turn limit the applicability of the method when very low losses such as those desirable for transmissive fibers are calculated.

Still according to the Applicant, a more precise, fully vectorial solution of the Maxwell equations is the one calculated in the above-cited article by D. Ferrarini et al. without the drawback of a fake background absorption.

More complex microstructured fibers are also described in the art. In the U.S. Pat. No. 5,802,236 a microstructured optical fiber is described comprising an inner cladding region having first cladding features, arranged in basically hexagonal form, surrounded by an outer cladding region comprising at least four layers of second cladding features. Two practical examples of fiber are discussed in that patent: in a first example, seven layers of features (cladding voids) are arranged around a central defect with a triangular unit cell, with a features array pitch of 2 μm; in a second example, the core is a silica rod surrounded by an inner layer of six features, which is in turn surrounded by more than four layers of smaller features, with a feature pitch of 0.925 μm. The Applicant observes that the large number of features involved in the fibers described in this patent poses the previously-mentioned loss problems.

The International patent application WO 02/39159 describes a microstructured optical fiber having a specially designed cladding to provide single mode waveguidance and low sensitivity to bending losses. The optical fiber has an inner and an outer cladding each comprising elongated features. The inner cladding features have normalized dimensions in the range from 0.35 to 0.50 and the outer cladding features have normalized dimensions in the range from 0.5 to 0.9, where the normalization factor is a typical feature spacing. The fiber is further characterized by a feature spacing of the inner cladding larger than 2.0 micron.

The Applicant observes that the fibers described in WO 02/39159 require different d/$\Lambda$ for inner and outer cladding holes, and the same remark given before holds for these fibers.

In view of the state of the art outlined in the foregoing, it would therefore be desirable to provide a microstructured optical fiber suitable for long-haul transmission systems, in particular a single-mode microstructured optical fiber having very low transmission losses. According to the Applicant, very low losses are achievable only if all the possible attenuation contributions are considered in the fiber design, including losses due to contamination and imperfection in the holes and losses due to leakage through the cladding.

It would also be desirable to provide one such fiber that can be easily manufactured, which exhibits a reasonable manufacturing robustness, and which guarantees the above optical performances regardless of small geometrical imperfections which always result in the manufacturing, particularly as far as the dimensions and the regularity of the microstructures are concerned.

SUMMARY OF THE INVENTION

The Applicant has found that by properly selecting the geometrical properties of a silica microstructured fiber, in particular the number of holes rings, the dimensions of the holes and of the core and the spacing between the holes, it is possible to obtain a microstructured fiber suitable for long-distance telecommunications, having a particularly reduced signal loss thanks to an optimized balance between Rayleigh scattering (from water absorption and surface imperfections) and radiation leakage through the cladding, having a high mechanical strength and being easy to manufacture. The proposed fiber is advantageously single-mode in a wide wavelength band.

The Applicant has in particular found that the above requirements are fulfilled by a microstructured fiber made of a single, undoped (and thus low-loss) material matrix, preferably pure silica, having longitudinal holes forming two or three rings around the core, wherein the average distance ($\Lambda$) between the holes is of at least 6 μm, the ratio between the effective radius ($r_{\it eff}$) of the core and the average distance between the holes is of at most 1, and the ratio between the diameter (d) of the holes and the average distance between the holes is of at least about 0.5.

In a fiber so designed, thanks in particular to the relatively high average distance between the holes and the relatively high dimensions of the holes with respect to the average distance between the holes, the radiation leakage through the cladding can be kept small. Moreover, thanks to the relatively low number of holes, problems of attenuation due to Rayleigh scattering from surface imperfections and due to impurities (including water) absorption are reduced, and the fiber is easy to manufacture and has a high mechanical strength. The Applicant has also verified that increasing the dimensions of the holes with respect to the distance between the holes contributes in reducing the problems of Rayleigh scattering and impurities absorption. Other contributions to Rayleigh scattering, such as that deriving from dopant concentration fluctuations in core-doped fibers, are avoided thanks to the provision of a pure-silica core. The fiber is moreover single-mode thanks to the relatively low dimensions of the core with respect to the average distance between the holes.

According to a first aspect thereof, the present invention thus relates to a microstructured optical fiber having a central axis and comprising a core extending along said axis and made of a first, undoped material having a first refractive index, and a cladding coextensive to and surrounding the core; the cladding comprising a background matrix made of said first material and having a plurality of holes formed in said background matrix, said holes extending parallel to the fiber axis, being arranged around the core in substantially concentric rings, and being filled with a second material having a second refractive index lower than the first refractive index; wherein the number of said rings of holes is two or three, the average distance between the holes is of at least about 6 μm, the ratio between an effective radius of the core and the average distance between the holes is of at most about 1, and the ratio between an average dimension of the holes and the average distance between the holes is of at least about 0.5.

Preferably, the holes are arranged according to a regular pattern. In particular, the holes are preferably arranged according to a triangular pattern. If the number of rings of holes is three, the plurality of holes preferably includes at most 36 holes. If the number of said rings of holes is two, the plurality of holes preferably includes at most 18 holes.

The first material is preferably silica. The second material is preferably air.

In a preferred embodiment of the invention, the optical fiber is a single mode fiber at least in the wavelength range between 1400 nm and 1650 nm.

Preferably, the ratio between the effective radius of the core and the average distance between the holes is of at most 0.8.

In a preferred embodiment of the invention, the holes may have all a same dimension; the number of said rings of holes is preferably three.

Preferably, the average distance between the holes is of at least about 9 μm.

The ratio between the diameter of the holes and the average distance between the holes is preferably of at least about 0.55, more preferably of at least about 0.6.

Another aspect of the present invention covers an optical transmission system including an optical fiber realized according to any one of the preceding claims.

BRIEF DESCRIPTION OF THE DRAWINGS

These and other features and the advantages of the present invention will be made apparent by the following detailed description of some embodiments thereof, provided merely by way of non-limitative examples, description which will be conducted making reference to the attached drawings, wherein.

DETAILED DESCRIPTION OF THE INVENTION

Figure 1:
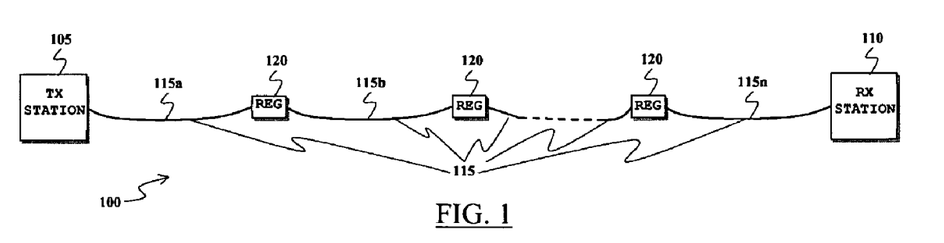
FIG. 1 shows quite schematically a long-haul optical transmission system wherein low-loss optical fibers according to an embodiment of the present invention are advantageously employed.

In FIG. 1, a long-haul optical transmission system 100 is schematically shown, which comprises a transmitting station ("TX STATION") 105 and a receiving station ("RX STATION") 110, located at a very far distance from one another, distance that may well be of several thousands kilometers (the two stations 105 and 110 may be for example located at respective sides of the Atlantic Ocean).

The two stations 105 and 110 are optically coupled to each other by a fiber optic cable 115 made up of several cable spans 115a, 115b, . . . , 115n, each span 115a, 115b, . . . , 115n having a maximum length which is substantially determined by the overall attenuation introduced by the optical fibers making up the cable. For example, in conventional, up-doped core silica fibers, featuring a loss of 0.2 dB/Km, the maximum span length is of about 100 Km (corresponding to an overall attenuation of approximately 20 dB which is experienced by an optical signal traveling along the span).

Between the intermediate cable spans 115a, 115b, . . . , 115n, regeneration stations ("REG") 120 are provided, typically including amplifiers (either all-optical or, most commonly, electrical, in which case opto-electrical and electro-optical conversion devices are needed) and, possibly, additional elements for regenerating the optical signals that have been attenuated in the propagation through the preceding cable spans.

Figure 2:
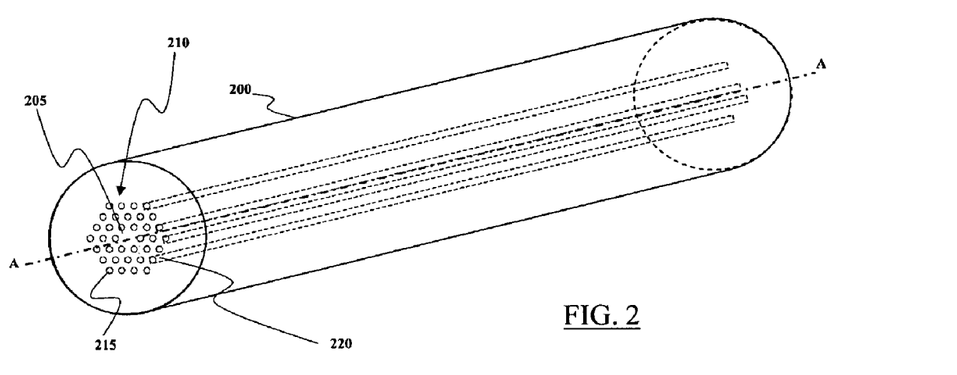
FIG. 2 schematically shows a segment of a low-loss optical transmission fiber of the long-haul transmission system of FIG. 1, according to an embodiment of the present invention.
Figure 3:
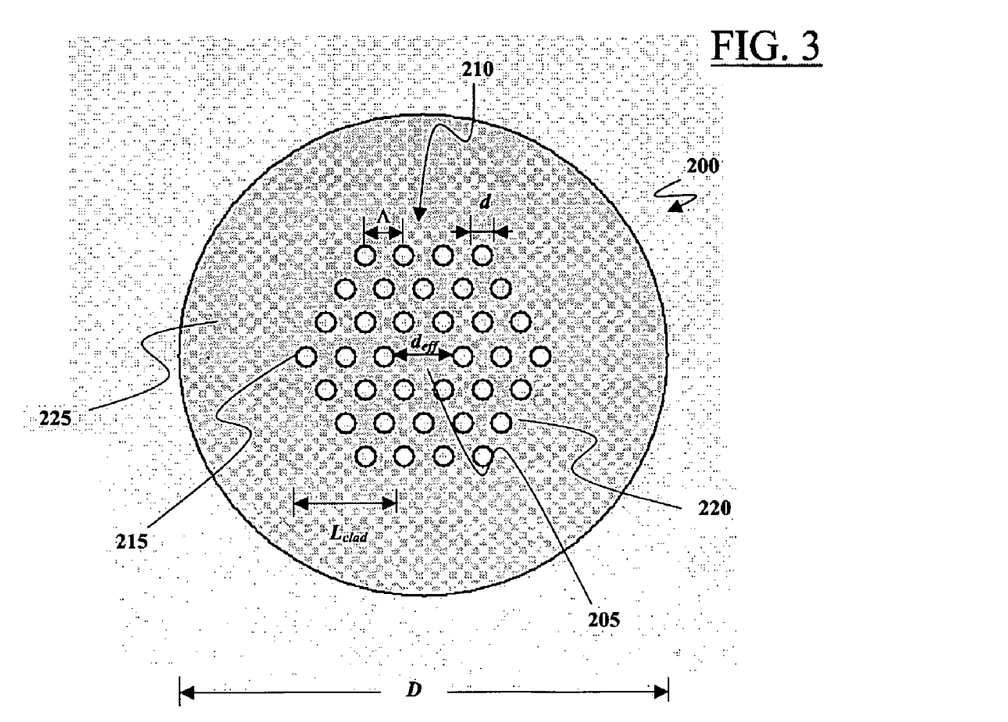
FIG. 3 schematically shows in enlarged scale a cross-sectional view of the low-loss fiber of FIG. 2.

Referring now to FIG. 2, a segment of an optical fiber 200 according to an embodiment of the present invention, exploited for example in the system 100, is schematically shown; the same fiber 200 is shown in enlarged-scale cross-sectional view in FIG. 3.

Specifically, the optical fiber 200 is a microstructured optical fiber, comprising a fiber core 205, made of a pure material, surrounded by a microstructured cladding 210 that comprises a plurality of microstructures or, simply, holes 215 extending along an axis A-A of the fiber 200. The array of holes 215 is formed in a background matrix 220, particularly of the same pure, undoped material as the core 205, and the holes are filled with a material (either solid, liquid or gaseous, possibly simple air) having a refractive index lower than that of the core 205.

Fiber 200 is preferably made of silica glass, which allows transmissions with very low attenuation from almost 800 nm to almost 1700 nm. A minimum loss well below 0.2 dB/km at a wavelength of about 1550 nm can be potentially obtained. However, other low-loss materials such as modified silica glasses, or other oxide or chalcogenide glasses may be also considered.

The microstructured cladding 210 is surrounded by an outer cladding 225, of the same material as the background matrix 220 and void of holes. The overall fiber diameter (including the outer cladding 225) will be indicated with D.

Thanks to the provision of the holes 215, filled with material having a lower refractive index than the fiber core 205, even though the fiber 200 is made of a single material the effective refractive index of the cladding 210 experienced by a light beam propagating in the fiber is lower than the refractive index of the core 205, and the light beam is therefore substantially confined within the core 205.

The holes 215 are preferably arranged according to a regular pattern, such as a triangular pattern, as in the example shown in the drawings; in particular, in the exemplary embodiment considered herein, the holes 215 are circular, have all substantially a same diameter d, and are mutually spaced substantially of an equal distance $\Lambda$ (center-to-center spacing).

The core 205 preferably results from the absence of one hole in the hole array, possibly from the absence of more than one hole in the hole array, so that a "defect" of the microstructure lattice is defined. However, the present invention can as well be applied to fibers having a core 205 which is not formed by a lattice "defect", such as a solid core region surrounded by concentric circular arrays of holes. Moving from the fiber axis A-A radially outwards, successive concentric rings of holes 215 are encountered. In the following of the present description, the number of hole rings is indicated with N. According to the present invention, the number of rings is two or, more preferably, three. In the shown example, the number of rings N is three.

It is observed that, although the holes 215 are preferably arranged according to a triangular array, other hole arrangements are possible, such as circular, hexagonal and square patterns.

It is also observed that, although preferably the holes have all the same diameter, hole arrangements are possible wherein holes in different rings have different diameters. Also, the holes may have shapes different from circular.

The effective diameter of the core 205, indicated with $d_{eff}$, corresponds to the diameter of a circle inscribed in the inner ring of holes. In the case wherein the core is formed by the absence of the central hole, it can be shown that $d_{eff}=2\Lambda-2d/2=2\Lambda-d$. The effective radius of the core 205, indicated with $r_{eff}$ ($r_{eff}=d_{eff}/2$), is therefore equal to $\Lambda-d/2$.

The fiber of the present invention has an effective radius $r_{eff}$ such that $r_{eff}/\lambda$ is lower or equal than about 1, preferably lower or equal than about 0.8. The Applicant has in fact verified that this condition, together with the condition on the ratio $d/\Lambda$ introduced herein after, imposes the fiber to operate as a single-mode fiber in the wavelength range from about 1300 nm to about 1650 nm.

Microstructured fibers can be fabricated in several different ways.

One of the most popular techniques for producing microstructured fibers, an embodiment of which is described for example in the U.S. Pat. No. 5,802,236, is the previously-mentioned "stack-and-draw" technique. According to this technique, a large number of solid and hollow silica rods (silica capillary tubes) are stacked inside a hollow glass cylinder, in a close-packed space arrangement reproducing the arrangement of holes that is to be obtained in the final fiber. The stacked silica rods are then welded together, and the resulting optical fiber preform is fed to a conventional draw furnace, and drawn by a conventional preform drawing method.

Another known technique for producing microstructured fibers, described for example in the European patent application No. EP 1 172 339 A1, makes use of a sol-gel process. A generically cylindrical mould is provided having a multiplicity of elongated elements extending therethrough; silica-containing sol is then introduced into the mould, and the sol is then caused to or permitted to gel. The resulting gel body is removed from the mould and the elongated elements are removed from the gel body (by mechanical extraction or, possibly, by chemical action or pyrolysis, depending on the nature of the elongate elements). The gel body is then dried and sintered. Finally, a microstructured fiber is obtained by drawing the sintered body.

Microstructured fibers may also be formed exploiting extrusion-based techniques, of the type described for example in the U.S. Pat. No. 5,774,779.

It is observed that other techniques for manufacturing microstructured fibers are known in the art.

In order to be suitable for telecommunication applications and, particularly, to be adapted to the use in a long-haul transmission system such as the system 100 of FIG. 1, the fiber 200 shall have very low losses, so as to reduce to a minimum the attenuation of a light beam propagating through the fiber. This allows, among other things, making longer fiber spans, thus reducing the number of regeneration stations.

It is observed that an advantage of the fiber according to the exemplary embodiment described herein is the provision of the pure, undoped material (silica) fiber core 205, where the light mainly propagates: this ensures that fiber losses due to Rayleigh scattering from fluctuations in the concentration of dopants, as discussed in the introductory part of the present description, are avoided.

However, this is per-se not sufficient for ensuring that the overall fiber losses are low. In fact, the fiber microstructured cladding 210 has a finite thickness, and light may leak therethrough; this phenomenon increases the fiber attenuation. It is pointed out that, without the use of appropriate claddings, leakage through the cladding easily becomes a severe limiting factor in signal transmission, unless a large number of holes is used.

As mentioned in the introductory part of the present description, the decrease of the fiber losses with the increase in the number of rings of holes has already been reported in the literature, together with the dependency of the losses on the values of the ratio of the hole pitch to the propagating light beam wavelength ($\Lambda/\lambda$), and of the ratio of the hole diameter to the hole pitch ($d/\Lambda$). Thus, the conclusion to be drawn from these prior-art documents is that the number of holes rings should be increased, in order to decrease the losses.

However, as discussed in the foregoing, the Applicant has observed that if, in the seek for achieving lower losses, the number of holes is increased, other problems are actually encountered, such as a greater absorption by the hydroxyl groups and metal impurities, an increased Rayleigh scattering due to the roughness of the hole surface, a higher manufacturing complexity and an increased fiber weakness. To limit these problems, the number of holes should be kept as low as possible.

The Applicant has then found that the number of hole rings should be selected by taking into account both the need of limiting the last-mentioned problems (which, as previously stated, would require having a low number of rings) and the need of limiting the light leakage across the cladding (which, to the contrary, would require having a high number of rings).

In the following discussion, a criterion allowing to find the minimum number of required microstructures that ensure that the losses are below a desired level will be presented.

Using the refractive index of silica, which is close to 1.44 at 1550 nm, and adopting the essentially correct solution to the Maxwell equations indicated in the above-mentioned article of Ferrarini et al., 'Leakage Losses in Photonic crystal Fibers', F15, OFC 2003, vol. 2, p. 699-700, the leakage through a cladding of finite thickness has been calculated under several conditions. The results for a silica fiber are hereinbelow reported (it is to be remarked that, although the results depend weakly on the refractive index of the fiber background matrix 220, they remain at least qualitatively valid also for matrix materials different from silica).

The geometrical distribution of the holes in the cladding consisted of several rings of air-filled holes 215 of diameter d, arranged according to a triangular lattice of pitch $\Lambda$ around the fiber core 205. The fiber core 205 has been assumed to be a central lattice "defect" of the hole array (i.e. a central region of the array characterized by the absence of one hole), of the same material as the background matrix 220 (i.e., pure, undoped silica).

Referring to FIG. 3, fibers having two (N=2) and three (N=3) rings of holes 215 have been particularly considered and investigated, with the holes arranged in a triangular pattern, which means 18 and 36 holes, respectively.

An overall diameter D of the fiber of 125 µm, a lattice pitch $\Lambda$ of 10 µm and a ratio d/$\Lambda$=0.5 have been considered (where d is the hole diameter or, in case the holes do not have all the same diameter, it is the average hole diameter; in case the holes do not have circular shape, the diameter d may be substituted for by a parameter descriptive of the average dimension of the holes, such as an effective diameter).

It is observed that the triangular distribution of the holes has the advantage of featuring uniformly spaced holes. Moreover, for a given cladding thickness, the triangular distribution features the smallest number of holes compared to the other periodic or non-periodic distributions of holes.

In a series of measurements, the Applicant has compared the performances of fibers having two or three rings of holes with fibers having a higher number of holes, for different combinations of hole's dimensions and distance.

Figure 4:
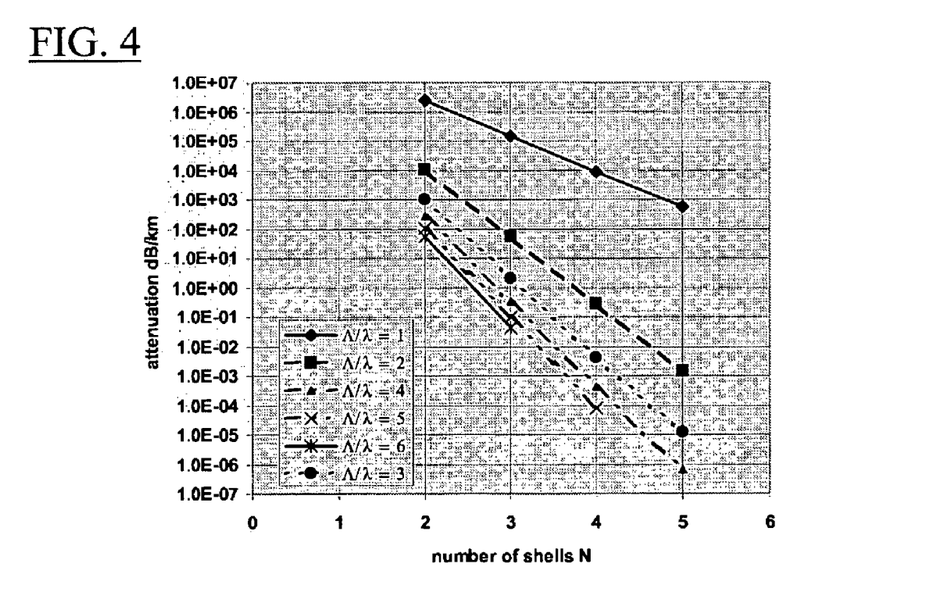
FIG. 4 is a diagram showing an optical fiber attenuation (in ordinate, dB/Km) as a function of the number N of shells or rings of holes in the fiber cladding (in abscissa), for a given, fixed ratio d/Λ (d: average diameter of a cladding hole; Λ: hole pitch), and for different Λ/λ ratios (λ: wavelength of the light to be transmitted by the fiber)

As reported in the diagram of FIG. 4, showing in ordinate the fiber attenuation in logarithmic scale (in dB/Km) and, in abscissa, the number N of rings of holes 215 in the cladding 210, it has been found that, for a same value of the ratio $\Lambda/\lambda$ (and of the ratio d/$\Lambda$, equal to 0.5), the radiation leakage through the cladding decreases exponentially with the number N of rings of holes.

This behavior can be quantitatively understood with a simple tunneling model for the confined core radiation through a cladding barrier, where the leakage through the barrier is exponentially decreasing with the thickness thereof. Here and below, with "cladding thickness" $L_{clad}$ it is intended the radial dimension of the region occupied by the holes, i.e. of the microstructured cladding 210.

It can thus be deduced that increasing the number N of rings of holes can make the radiation leakage through the cladding negligible.

However, the number of holes increases as $N^2$, and this is a major drawback in terms of fiber manufacturing and transmission loss as explained before.

The Applicant has therefore investigated the dependence of the radiation leakage through the cladding on the other two parameters: the pitch $\Lambda$ and the hole diameter d, again in fibers having holes arranged in a triangular lattice.

Figure 5:
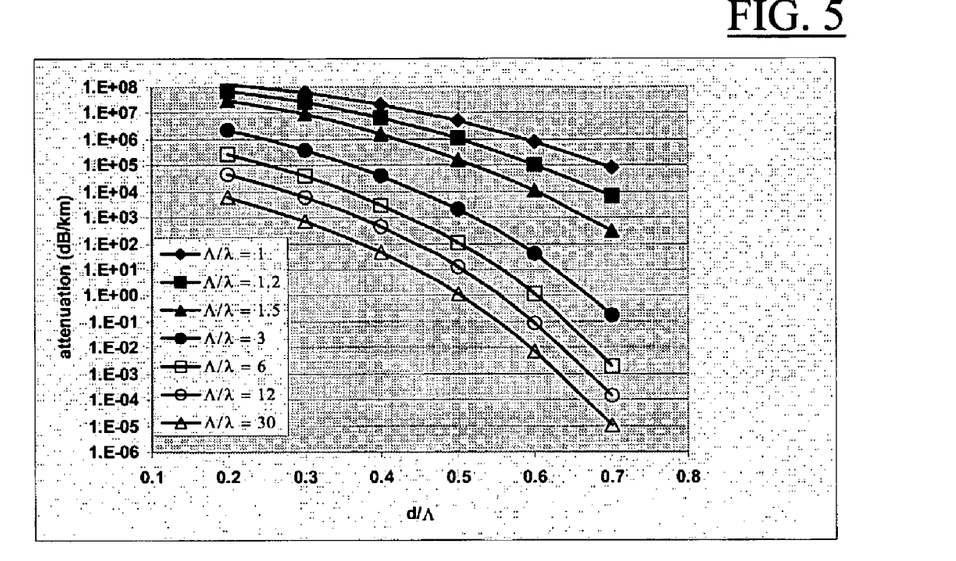
FIG. 5 is a diagram showing the attenuation (in ordinate, dB/Km) of a fiber with two rings of holes in the cladding (N=2) as a function of the ratio d/λ, for different Λ/λ ratios.

The diagram of FIG. 5 shows in ordinate the fiber attenuation in logarithmic scale (in dB/Km) and in abscissa the values of the ratio d/$\Lambda$ for a fiber having two rings of holes. As reported in the diagram, the radiation leakage through the cladding decreases with the increase in the value of the ratio d/$\Lambda$, fixed the value of the ratio $\Lambda/\lambda$ ($\lambda$ being the radiation wavelength).

This behavior can be quantitatively understood with the decrease of the effective refractive index of the cladding as the value of the ratio d/$\Lambda$ increases (there is a prevalence of air compared to the background matrix), which then provides for an increased barrier to the escape of light.

Figure 6:
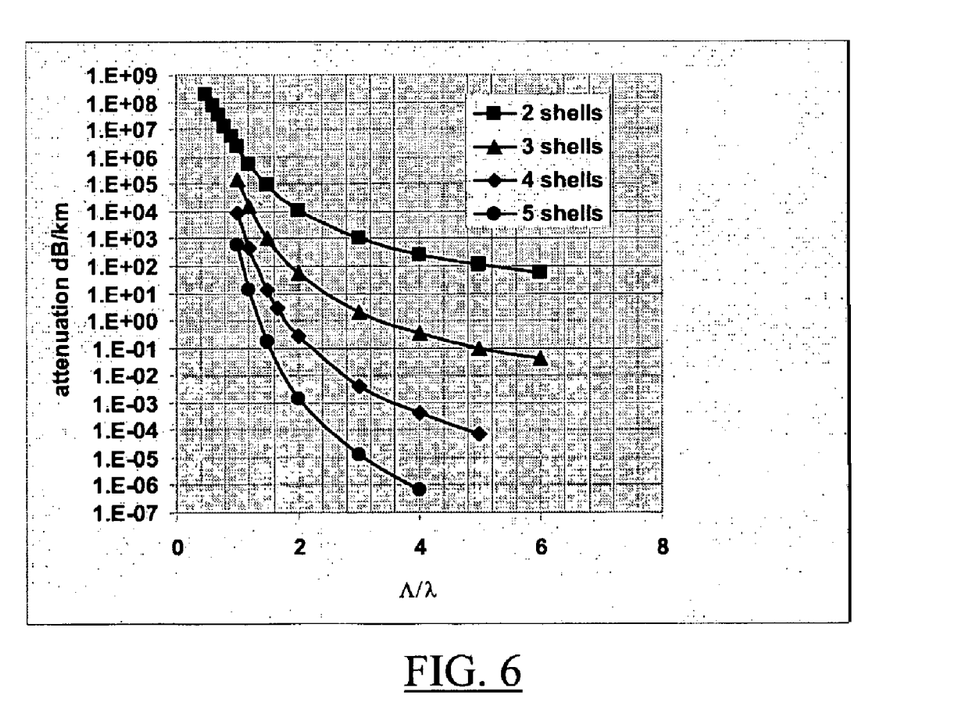
FIG. 6 is a diagram showing the fiber attenuation (in ordinate, dB/Km) as a function of the ratio Λ/λ), for a given, fixed ratio d/Λ, and for different numbers N of rings of holes in the cladding (N=2, 3, 4, 5)

The diagram of FIG. 6 reports in ordinate the fiber attenuation in logarithmic scale (in dB/Km) and in abscissa the values of the ratio $\Lambda/\lambda$, for fibers with two, three, four and five rings of holes. It can be appreciated that the radiation leakage through the cladding decreases with the increase in the value of the ratio $\Lambda/\lambda$, fixed the value of the ratio d/$\Lambda$. This behavior can be explained by considering that, although the height of the barrier to the escape of light decreases with increasing $\Lambda/\lambda$, as the effective refractive index of the cladding becomes closer to that of the background material and of the confined mode, the increase of the thickness of the cladding layer becomes more important and, as a result, the tunneling of light is less effective and the leakage of radiation is reduced.

The leakage values (in dB/km) reported in diagrammatic form in the FIGS. 5 and 6 are summarized in Table 1 hereinbelow, limited to N=2 and N=3.

TABLE 1 cladding leakage as a function of $\Lambda/\lambda$ and d/$\Lambda$, for microstructured fibers with two rings of holes (above) and three rings of holes (below)

| $\Lambda/\lambda$ | d/$\Lambda$ 0.2 | 0.3 | 0.4 | 0.5 | 0.6 | 0.7 |
|---|---|---|---|---|---|---|
| N = 2 | | | | | | |
| 30 | 6.11E+03 | 7.28E+02 | 4.69E+01 | 1.22E+00 | 7.57E−03 | 1.10E−05 |
| 15 | 2.82E+04 | 3.50E+03 | 2.38E+02 | 6.77E+00 | 4.70E−02 | 6.65E−05 |

TABLE 1-continued cladding leakage as a function of Λ/λ and d/Λ, for microstructured fibers with
two rings of holes (above) and three rings of holes (below)

| Λ/λ | d/Λ 0.2 | 0.3 | 0.4 | 0.5 | 0.6 | 0.7 |
|---|---|---|---|---|---|---|
| 12 | 4.74E+04 | 5.99E+03 | 4.19E+02 | 1.24E+01 | 9.26E−02 | 1.41E−04 |
| 6 | 2.73E+05 | 3.78E+04 | 3.01E+03 | 1.09E+02 | 1.15E+00 | 1.87E−03 |
| 3 | 2.37E+06 | 3.86E+05 | 3.87E+04 | 2.05E+03 | 4.10E+01 | 1.77E−01 |
| 1.5 | 3.20E+07 | 9.15E+06 | 1.63E+06 | 1.75E+05 | 1.07E+04 | 3.22E+02 |
| 1.2 | 7.17E+07 | 2.70E+07 | 6.82E+06 | 1.08E+06 | 1.08E+05 | 6.71E+03 |
| 1 | 1.33E+08 | 6.14E+07 | 2.12E+07 | 4.89E+06 | 7.55E+05 | 8.32E+04 |
| N = 3 | | | | | | |
| 30 | 3.14E+02 | 5.89E+00 | 6.57E−02 | 2.69E−04 | 1.20E−07 | 1.64E−12 |
| 12 | 1.49E+03 | 3.00E+01 | 3.84E−01 | 1.78E−03 | 1.18E−06 | 3.30E−11 |
| 6 | 9.51E+03 | 1.96E+02 | 2.88E+00 | 1.71E−02 | 1.88E−05 | 1.28E−09 |
| 3 | 3.85E+05 | 6.72E+03 | 1.25E+02 | 1.23E+00 | 3.44E−03 | 1.20E−06 |

The Applicant has identified a parameter that alone is appropriate for describing the behavior of the electromagnetic field in the microstructured cladding. Such a parameter is the "in-plane wavelength" $\lambda_p$ of light in the cladding.

Given the effective cladding index $n_{eff}$ (calculated as the highest refractive index of the corresponding photonic crystal, as already well documented in previous literature on microstructured fibers, for example the already cited paper by A. Bjarklev et al., 'Photonic crystal fibres—The state-of-the-art', 28$^{th}$ European Conference on Optical Communication ECOC 02, Copenhagen, Denmark, 2002 and the mode index $n_m$ (calculated from the solution of the propagation equation for the considered structure), the in-plane wavelength $\lambda_p$ of light in the cladding is defined as:

$$\lambda_p = \frac{\lambda}{2\pi\sqrt{n_m^2 - n_{eff}^2}}$$

where λ is the wavelength of the light propagating through the fiber. The 2π factor accounts for the fact that the electromagnetic field has a radially decaying behavior in the cladding; in fact, the wavelength $\lambda_p$ is readily read off a logarithmic plot of the intensity of the electromagnetic field along a radius, as twice the inverse of its slope in the cladding region.

As will be discussed in greater detail in the following, in order to keep the radiation leakage through the cladding low despite the relatively low number of holes, the average distance between the innermost and outermost holes shall be sufficiently large compared with the wavelength of light in the plane orthogonal to the fiber axis.

Preferably, the average distance between the holes shall be not too large compared to the in-plane wavelength; in particular, Λ is preferably lower than $6\lambda_p$. This allows having fibers in which the radiation leakage through the cladding remains limited and under control against geometrical inaccuracies such as non-uniform hole distances and diameters.

Also, the in-plane wavelength shall preferably be not too large compared to the wavelength of light at which the signal is transmitted; preferably, $\lambda_p$ is lower than 3λ. This allows having fibers with small macrobending loss.

By carefully choosing the distribution and the size of the holes, fibers having other advantageous optical characteristics, such as the cut-off wavelength and an appropriate group velocity dispersion, can be obtained.

For fibers made of silica and intended to be used in long-haul optical transmission systems, it would be desirable to achieve a radiation leakage through the cladding below 0.01 dB/km. It has been found from extensive numerical simulation and from their interpretation with an empirical tunneling model that such a requirement is fulfilled for a thickness $L_{clad}$ of the microstructured cladding 210 at least ten times larger than the in-plane wavelength of light $\lambda_p$.

Considering the triangular hole lattice, the cladding thickness $L_{clad}$ is related to both the lattice pitch Λ and the number of holes rings N, and it is essentially given by the product NΛ, apart from a minor reduction of the first ring, of about 0.1Λ, due to the effective core dimensions.

For different geometrical distributions of the holes 215, when the holes distribution is sufficiently uniform and the cladding has a circular shape, the cladding thickness $L_{clad}$ may be related to the average mutual distance $\Lambda_{avg}$ of the microstructures 215, to the number $N_m$ of microstructures (holes) 215, and to the average distance $L_{avg}$ of the microstructures from the fiber axis A-A, by the following equation:

$$L_{clad} = \frac{N_m \Lambda_{avg}^2}{2\pi L_{avg}}$$

where $$\Lambda_{avg} = \frac{1}{N_m} \sum_i \min_j (d_{ij})$$

being $d_{ij}$ the distance between the centers of the i$^{th}$ and j$^{th}$ microstructures 215, the indexes i and j running over all the microstructures, and $$L_{avg} = \frac{1}{N_m} \sum_i r_i$$

being $r_i$ the distance between the fiber axis and the center of the i$^{th}$ microstructure.

For the triangular lattice, the above-reported formula gives $L_{clad}$=1.82Λ for two rings (N=2), and $L_{clad}$=2.64 Λ for three rings (N=3), which is close to the simplified estimate of NΛ: the discrepancy originates from the use of an equivalent circular cladding to define the effective cladding, whereas for the triangular lattice such a shape is not circular.

In Table 2 hereinbelow the calculated value of the ratio $\lambda_p/\lambda$ and $\Lambda/\lambda_p$ for different values of the ratio $\Lambda/\lambda$ and $d/\Lambda$ is reported, for the considered triangular lattice claddings.

TABLE 2 calculated $\lambda_p/\lambda$ (above) and $\Lambda/\lambda_p$ (below) for different $\Lambda/\lambda$ and $d/\Lambda$

| $\Lambda/\lambda$ | $d/\Lambda$ | | | | | |
|---|---|---|---|---|---|---|
| | 0.2 | 0.3 | 0.4 | 0.5 | 0.6 | 0.7 |
| $\lambda_p/\lambda$ | | | | | | |
| 30 | 21.32 | 14.17 | 10.27 | 7.69 | 5.68 | 4.12 |
| 12 | 9.18 | 5.99 | 4.31 | 3.21 | 2.38 | 1.73 |
| 6 | 5.20 | 3.25 | 2.31 | 1.71 | 1.27 | 0.93 |
| 3 | 3.71 | 1.94 | 1.32 | 0.97 | 0.72 | 0.53 |
| 1.5 | | 1.76 | 0.96 | 0.65 | 0.48 | 0.36 |
| 1 | | | 1.14 | 0.66 | 0.46 | 0.34 |
| $\Lambda/\lambda_p$ | | | | | | |
| 30 | 1.41 | 2.12 | 2.92 | 3.90 | 5.28 | 7.28 |
| 12 | 1.31 | 2.00 | 2.78 | 3.74 | 5.05 | 6.92 |
| 6 | 1.15 | 1.85 | 2.60 | 3.52 | 4.74 | 6.45 |
| 3 | 0.81 | 1.54 | 2.27 | 3.10 | 4.17 | 5.61 |
| 1.5 | | 0.85 | 1.56 | 2.29 | 3.13 | 4.14 |
| 1 | | | 0.88 | 1.52 | 2.18 | 2.90 |

In connection with the results of Table 2, it has to be remarked that negligible leakage may be achieved with two rings of holes (N=2) for larger values of the ratios $\Lambda/\lambda$ and $d/\Lambda$ and with three rings of holes (N=3) for smaller values of the ratios $\Lambda/\lambda$ and $d/\Lambda$.

In particular, for telecommunication applications in the wavelength range from about 1400 nm to about 1650 nm, the above requirements result into a pitch $\Lambda$ larger than 6 μm, preferably larger than 9 μm, and into a hole diameter to pitch ratio $d/\Lambda$ larger than 0.5, preferably larger than 0.6.

It is observed that fibers featuring thick claddings (i.e., claddings having relatively large values of $L_{clad}$) through large values of the $\Lambda/\lambda$ ratio (that is, large holes pitch values compared to the light wavelength) may have the problem that their effective refractive index difference $\Delta n$ (the difference in refractive index between the fiber core 205 and the microstructured cladding 210) is relatively small, and the mode field diameter consequently large. These conditions are indicative of potential problems for the macro- and microbending losses. Such losses also depend on other design, manufacturing and application factors, such as the coating softness, cable type, and splice joints respectively. However, tests on tightly wound bobbins are standard to characterize macro-bending: for example, a significant test considers a fiber wound on a bobbin of 12 cm diameter. The fiber is considered robust for the telecommunication applications when the loss induced by bending does not exceed a fraction of a dB/m.

The Applicant has also investigated theoretically the influence of the ratio $d/\Lambda$ on the optical losses originated at the holes surfaces. These optical losses include Rayleigh scattering losses due to surface roughness and optical absorption induced by extrinsic impurities present on the holes surfaces. Both optical losses are substantially proportional to the electromagnetic field intensity at the holes surfaces. The Applicant has found that the following dimensionless parameter R can characterize these losses effects at a wavelength $\lambda$:

$$R = \frac{\lambda d \sum_{holes} \oint d\theta |\vec{E}(\vec{r}(\theta))|^2}{2 \int\int d^2\vec{s}\, |\vec{E}(\vec{s})|^2}$$

where θ is between 0 and $2\pi$, $\vec{r}$ is the coordinate along the circumference delimiting the holes in the plane orthogonal to the fiber axis, $\vec{s}$ is the coordinate in the plane orthogonal to the fiber axis and $\vec{E}$ is the electric field. The line integrals are therefore carried out over the holes boundaries in the plane orthogonal to the fiber axis, and the surface integral is carried out over the whole plane. The surface integral is essentially proportional to the power flux carried by the fiber, and gives the appropriate normalization.

The factor R allows a useful comparison for fibers featuring different diameter to pitch ratios, manufactured in the same process conditions. In fact, the considered conditions at the holes surfaces (i.e., roughness and presence of extrinsic impurities) are essentially independent from the hole diameter d, since the diameter d is micrometric whereas the surface roughness is sub-nanometric and diffusion of metal impurities entering from the hole surface is sub-micrometric.

It is known to people skilled in the art that penetration of the electric field into the holes (and thus the electric field intensity on their surfaces) is highly suppressed by the large difference between the index of refraction of air (or vacuum) and silica glass. The Applicant has found that, for a given wavelength, the larger are the holes the higher is this suppression. Moreover, the Applicant has found that by increasing the holes dimensions, not only a smaller number of holes is required for good field confinement, but also only the holes closest to the core of the fiber give a significant contribution to the factor R. Differently, if the holes are small, the suppression of the penetration of the electric field into the holes is reduced, and poor field confinement in the core demands a large number of holes to be used. Therefore, a large number of holes contributes to the factor R.

Using the above formula, the Applicant has compared the behavior of a microstructured fiber according to the present invention with that of a microstructured fiber having a much lower diameter to pitch ratio. In particular, the Applicant has considered a first fiber having $d/\Lambda=0.55$ and $\Lambda=12$ μm and a second fiber having $d/\Lambda=0.2$ and $\Lambda=7.4$ μm, the two fibers having substantially the same mode effective area of about 150 μm². The calculated values were $R=1.7\cdot 10^{-3}$ at $\lambda=1.55$ μm for the first fiber and of $R=6.5\cdot 10^{-3}$ at $\lambda=1.55$ μm for the second fiber. In can be appreciated that the R value, which is representative of the losses originated at the holes surfaces, is almost four times higher for the second fiber than for the first fiber.

The Applicant has also investigated the macrobending losses using a widely used formula for step index fibers as described in D. Marcuse 'Curvature loss formula for optical fibers', Journal of the Optical Society of America, vol. 66, pages 216-220, 1976, and using the effective index model for the microstructured fiber also described in the already cited paper by A. Bjarklev et al., 'Photonic crystal fibres—The state-of-the-art', 28th European Conference on Optical Communication ECOC 02, Copenhagen, Denmark, 2002, to define an equivalent step index fiber. The results are reported in Table 3 hereinbelow. The approach has been shown to be of relevance for example in Electronic Letters vol. 37, page 287-289, (2001).

TABLE 3 estimated macrobending loss in dB/m for different values
of Λ/λ and d/Λ, for a fiber wound around a 12 cm diameter bobbin

| Λ/λ | δ/Λ 0.2 | 0.3 | 0.4 | 0.5 | 0.6 | 0.7 |
|---|---|---|---|---|---|---|
| 30 | 8.78E+02 | 1.76E+03 | 3.54E+03 | 6.24E+03 | 7.72E+03 | 2.62E+03 |
| 12 | 8.19E+02 | 6.34E+02 | 1.18E+02 | 8.56E-01 | ≈0 | ≈0 |
| 6 | 1.40E+02 | 2.48E-01 | ≈0 | ≈0 | ≈0 | ≈0 |
| 3 | 1.91E+00 | ≈0 | ≈0 | ≈0 | ≈0 | ≈0 |

As the exponent in the above-cited formula for step-index fibers is directly related to the ratio $\lambda_p/\lambda$, this ratio can be used to characterize fibers which are resistant to the macro-bending losses, as those fibers having values of the ratio $\lambda_p/\lambda$ smaller than 3.

Additionally, potential problems in the manufacturing of the microstructured fibers have been investigated, when the realized geometries show consistent deviations from the designed, target geometries.

In particular, the Applicant has investigated the effects of a deviation of the position and diameter of the holes in the microstructured fiber, around their correct, expected average values, with a gaussian probability distribution characterized by a standard deviation $\sigma_r$ relative to Λ.

It has been found that the disorder resulting from such deviations always increases the cladding radiation leakage through the cladding, and the probability distribution of the leakage becomes skewed to large values, with a standard deviation which eventually becomes larger than the average, for large disorders. These probability distributions render these fibers (having a standard deviation larger than the average) not interesting for large-scale manufacturing.

Figure 7:
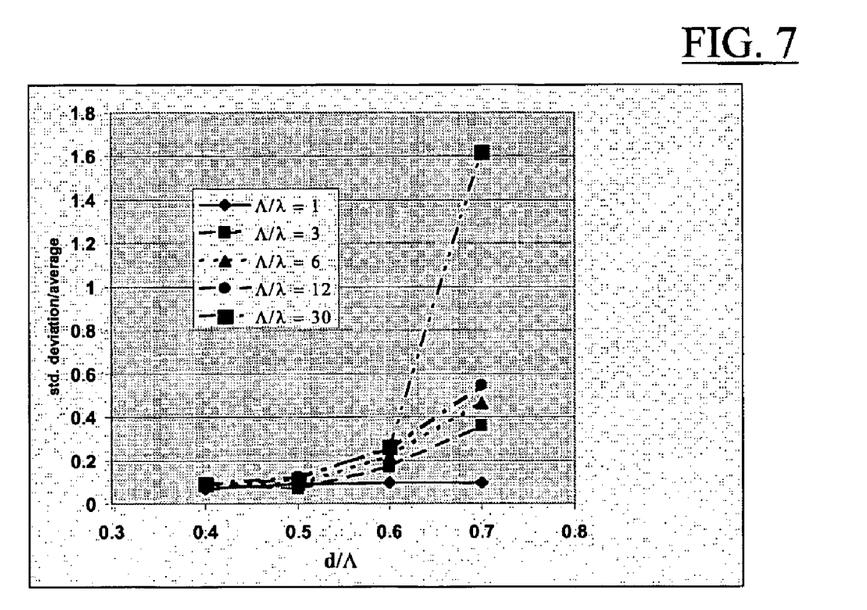
FIG. 7 is a diagram showing (in ordinate) the ratio of the standard deviation to the average of the probability distribution of the fiber losses, as a function of the ratio d/Λ, for different values of the ratio Λ/λ.

In particular, it has been found that fibers having large values of the ratios Λ/λ and d/Λ are more sensitive to this problem. As an example, the diagram in FIG. 7 shows in ordinate the ratio of the standard deviation to the average of the probability distribution of the cladding leakage, as a function of the value of the ratio d/Λ, for different values of the ratio Λ/λ. Again, the simple parameter $\lambda_p$ can be used to characterize those fibers which are sufficiently robust to manufacturing inaccuracies. In particular, the Applicant has found from extensive numerical calculations that for relative $\sigma_r$ of up to 6%, good manufacturing yields are assured when the average distance $\Lambda_{avg}$ between the holes is $\Lambda_{avg} < 6\lambda_p$.

In Table 2 the ratio $\Lambda/\lambda_p$ for the triangular lattice cladding case is reported. It is pointed out that the above limitation on the average distance $\Lambda_{avg}$ between the holes can be relaxed for relative $\sigma_r$ smaller than 6%.

Two preferred practical examples, obtained by numerical simulations, are herein below presented.

PREFERRED EXAMPLES

As a first example, application of the present invention to fibers for ultra-low loss applications are considered, where the desired cladding leakage is set below 0.01 dB/km (i.e., a rather strict condition). This is typically the case of fibers for use in long-haul optical transmission systems such as the system of FIG. 1.

The Applicant has considered a fiber with three rings of holes, in particular with 36 holes arranged according to a triangular pattern, having the following dimensions: Λ=12 μm, d/Λ=0.55 (that is d=6.6 μm) and $r_{eff}/\Lambda=0.725$.

This fiber is essentially single mode, because the higher-order modes experience a very high cladding leakage, well above 600 dB/km, and large bending losses. Even a modest length of a few tens of meters of straight fiber behaves substantially as a single mode fiber, as the power carried in the higher modes becomes effectively negligible after propagating for such a length. Thus, the radiation leakage through the cladding is expediently used to filtering out high-order modes.

For single-mode transmission at 1550 nm, the Applicant has estimated for the above fiber a cladding leakage below 0.01 dB/km, although there is a dependency on the fabrication tolerance.

Figure 8:
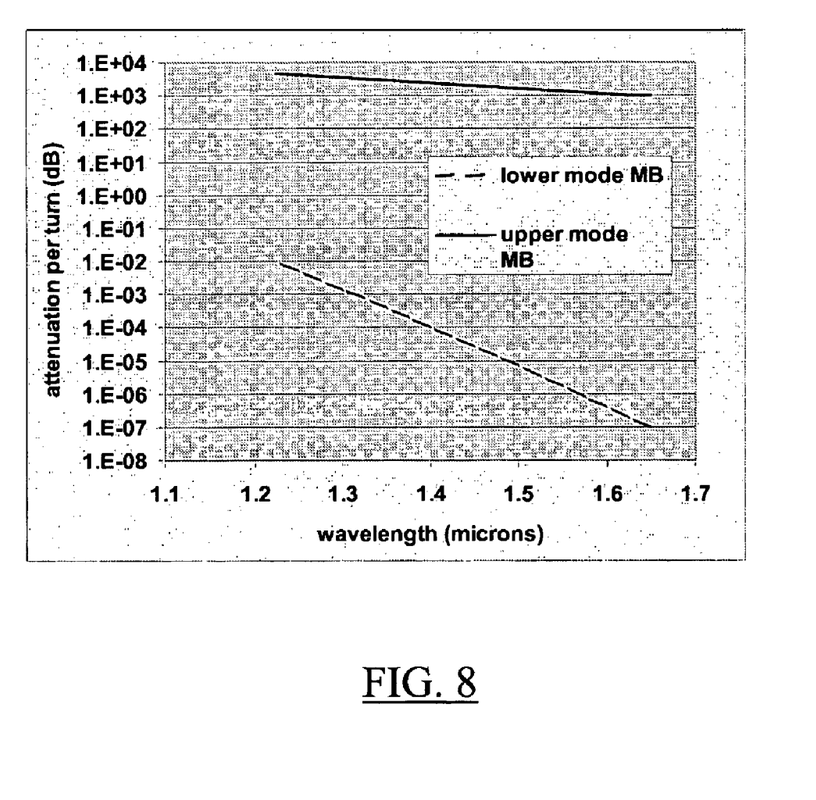
FIG. 8 is a diagram showing the fiber attenuation due to macrobending losses (in ordinate, dB) per turn on a 6 cm diameter mandrel.

The filtering mechanism through cladding leakage cooperates with the usual filtering occurring in the cabled fiber, which is provided by the losses of the higher-order modes when the fiber is cabled and wound over the standard mandrel in the splice box. This practice results in the definition of a cable-cutoff wavelength $\lambda_{cc}$. Since the Macro-Bending (MB) loss of the higher-order mode above the fundamental one with the 6.0 cm diameter bobbin is always well above the one for the fundamental mode all over the transparency window of silica glass, as shown in the diagram of FIG. 8, the cable-cutoff wavelength $\lambda_{cc}$ is certainly below this transparency window, as required for long-haul transmission fibers. In particular, the macro-bending loss is negligible (lower than 0.01 dB for 100 turns on a 60 mm diameter mandrel) for the fundamental mode in the 1400 nm to 1625 nm band, while it is very high for the higher order mode. The fundamental mode has a remarkable effective area of 150 μm² at 1550 nm. Such a large effective area, combined with the smaller non-linearity of pure, undoped silica compared to that of doped silica, also provides for a remarkably low-nonlinearity solution for ultra-long haul applications. Moreover, its large group velocity dispersion at 26 ps/(nm km) at 1550 nm further helps to limit the nonlinear wave-mixing effects.

The dispersion value can be tuned by slightly varying one or more geometrical parameters, such as the hole diameter d.

Although a fiber structure according to the present invention is particularly suitable for long-haul telecommunication applications, it may give some advantages also in short-distances telecommunication applications, such as in terrestrial systems. A fiber for these application advantageously has a large effective area so as to have a low splice loss, which, for terrestrial applications featuring a splice every about 2 km, translates into an overall lower attenuation for the optical link.

Short-distance systems may include uncompensated and unamplified links running at a maximum of 10 Gbit/s from a few km up to some tens of km, dropping out from a metro-ring, or as a part of it. Transmission of a single or at most a few wavelengths around 1310 nm is desirable for these distances, for the lowest system cost.

As the loss of silica is about 0.3 dB/km at 1310 nm, a clad leakage of 0.1 dB/km can be well tolerated (thus, a loss of one order of magnitude higher than in the previous example).

Compared to the loss of a standard single mode fiber, of about 0.35 dB/km, this additional loss does not substantially increase the power budget and system costs over the lengths considered. Using $\Lambda=15$ μm, two rings of holes and $d/\Lambda=0.6$, the effective area of the guided mode is over 200 μm$^2$, which significantly lowers the splicing losses, and easily recovers the marginally larger loss of 0.05 dB/km compared to the conventional standard mode fiber. The group velocity dispersion is about 6 ps/(nm km) at 1310 nm. This allows avoiding dispersion compensation for lengths well over 50 km, regardless of the quality of the laser sources used in the application, just as in the standard single mode product. Higher order modes propagate in the fiber, but with a clad leakage larger than 60 dB/km.

For the applications considered, the fiber is effectively single-mode and suitable for high bit-rate transmission. The macro-bending loss for the 60 mm diameter mandrel is 0.026 dB/turn, which is well below the IEC requirements.

The Applicant has estimated for this fiber a cladding leakage below 0.1 dB/km at 1310 nm, although there is a dependency on the fabrication tolerance.

Although the present invention has been disclosed and described by way of some embodiments, it is apparent to those skilled in the art that several modifications to the described embodiments, as well as other embodiments of the present invention are possible without departing from the scope thereof as defined in the appended claims.

For example, although a microstructured fiber provided with air-filled holes is a preferred embodiment of the present invention, a microstructured fiber according to the present invention may also be realized with microstructures of different type, such as with solid rods placed in the holes, or holes filled with a liquid or gaseous material different from air, provided that the above-mentioned requirements on the geometry of the microstructured fiber are fulfilled.

The invention claimed is:

1. A microstructured optical fiber comprising:
   an optical fiber axis;
   a core extending along said axis, the core being made of a first, undoped material having a first refractive index; and
   a cladding coextensive with and surrounding the core, wherein the cladding comprises a background matrix made of said first material, and has a plurality of holes formed in said background matrix, said holes extending parallel to the fiber axis, being arranged around the core in substantially concentric rings, and being filled with a second material having a second refractive index lower than the first refractive index,
   the number of said rings of holes being two or three;
   the average distance between the holes being at least about 6 μm;
   the ratio between an effective radius of the core and the average distance between the holes being at most about 1; and
   the ratio between an average dimension of the holes and the average distance between the holes being at least about 0.5,
   and wherein:
   when the number of said rings is two, the average dimension of the holes ranges from about 3 μm to about 9 μm, and
   when the number of said rings is three, the average dimension of the holes ranges from about 3 μm to about 6.6 μm.

2. The microstructured optical fiber according to claim 1, wherein the holes are arranged according to a regular pattern.

3. The microstructured optical fiber according to claim 2, wherein the holes are arranged according to a triangular pattern.

4. The microstructured optical fiber according to claim 3, wherein the number of said rings of holes is three and the plurality of holes is at most 36 holes.

5. The microstructured optical fiber according to claim 3, wherein the number of said rings of holes is two and the plurality of holes is at most 18 holes.

6. The microstructured optical fiber according to claim 1, wherein said first material is silica.

7. The microstructured optical fiber according to claim 1, wherein said second material is air.

8. The microstructured optical fiber according to claim 1, comprising a single mode fiber at least in the wavelength of 1400 nm to 1650 nm.

9. The microstructured optical fiber according to claim 1, wherein a ratio between an effective radius of the core and the average distance between the holes is at most 0.8.

10. The microstructured optical fiber according to claim 1, wherein the holes are all the same dimension.

11. The microstructured optical fiber according to claim 1, wherein the number of said rings of holes is three.

12. The microstructured optical fiber according to claim 1, wherein said average distance between the holes is at least about 9 μm.

13. The microstructured optical fiber according to claim 1, wherein the ratio between the average dimension of the holes and the average distance between the holes is at least about 0.55.

14. An optical transmission system comprising a microstructured optical fiber of claim 1.

* * * * *